United States Patent [19]

Reinicke et al.

[11] 3,872,135

[45] Mar. 18, 1975

[54] SEPARATION OF ANTHRAQUINONE FROM A MIXTURE OF ITS VAPOR WITH A CARRIER GAS

[75] Inventors: Helmut Reinicke, Ludwigshafen; Dieter Stockburger, Gruenstadt; Theo Teutsch, Neuhofen; Ludwig Vogel, Frankenthal; Hermann Wistuba, Mannheim; Heinz Engelbach, Limburger, all of Germany

[73] Assignee: Badische Anilin & Soda-Frabrik Aktiengesellschaft, Ludwigshafen/Rhine, Germany

[22] Filed: June 29, 1973

[21] Appl. No.: 375,177

[30] Foreign Application Priority Data
July 1, 1972 Germany..........................2232453

[52] U.S. Cl..................... 260/369, 23/294, 260/706
[51] Int. Cl............................................. C09b 1/00
[58] Field of Search ............... 260/369, 706; 23/294

[56] References Cited
UNITED STATES PATENTS
3,330,863  7/1967  Read et al........................... 260/525
3,699,134  10/1972  Armbrust et al..................... 260/369

FOREIGN PATENTS OR APPLICATIONS
115,305  7/1965  Czechoslovakia
40-11382  6/1965  Japan................................. 260/385

OTHER PUBLICATIONS
Wilke, Chemical Industries, July 1948, pp. 34–38 and pp. 122 and 124 (1948).

Primary Examiner—Lorraine A. Weinberger
Assistant Examiner—E. Jane Skelly
Attorney, Agent, or Firm—Johnston, Keil, Thompson & Shurtleff

[57] ABSTRACT

Separation of anthraquinone from a mixture of its vapor with a carrier gas by treating the hot gas-vapor mixture with an aqueous suspension of anthraquinone. The anthraquinone produced according to the process of the invention is a valuable intermediate for the production of dyes and pesticides.

16 Claims, 1 Drawing Figure

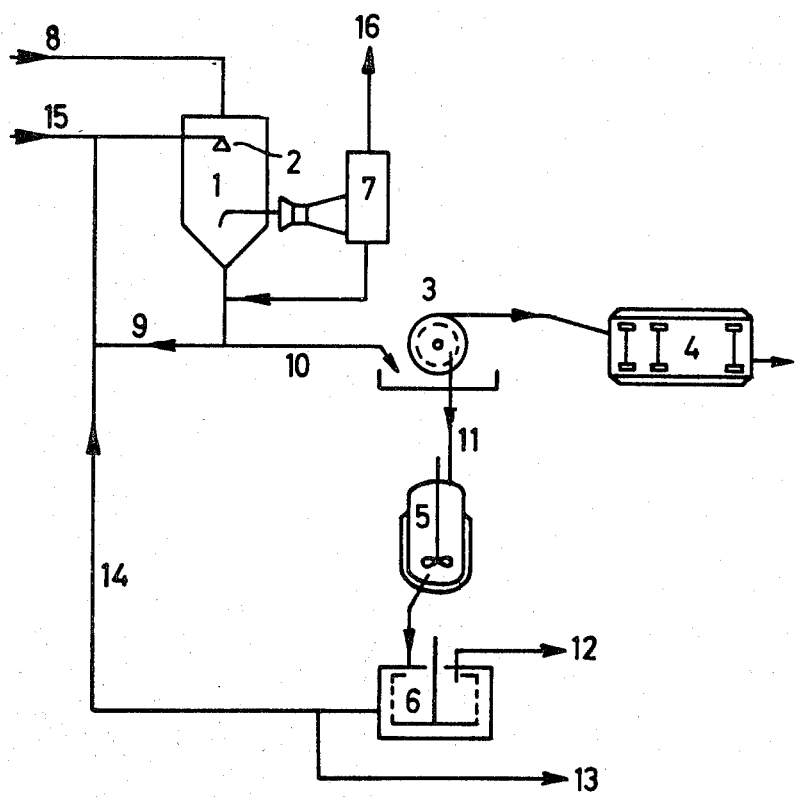

SEPARATION OF ANTHRAQUINONE FROM A MIXTURE OF ITS VAPOR WITH A CARRIER GAS

The invention relates to a process for the separation of anthraquinone from a mixture of its vapor with a carrier gas by treating the hot gas-vapor mixture with an aqueous suspension of anthraquinone.

From German Laid-Open Specification DAS 1,127,873 it is known that an anthraquinone-air mixture, such as is produced by the catalytic oxidation of anthracene vapour over an alkaline vanadium oxide catalyst, can be cooled by evaporation of a mist of aqueous liquid, so that the anthraquinone condenses and is obtained as a powder which can be regarded for practical purposes as being completely dry. This German specification teaches that the mist of liquid and hence the water added in the treatment zone are completely and immediately converted into water vapor. The temperature of the added water is 100°C, and hence from the carrier gas there is removed only that quantity of heat which corresponds to the latent heat of evaporation of the water. The cooling of the carrier gas should be limited to avoid reaching a temperature at which the carrier gas becomes saturated with the vaporous impurities it contains. In order to achieve immediate and complete evaporation, particular ways of atomising the water and particular particle sizes of the water are preferred. For forming the liquid mist, distilled or softened water is used. In the case of carrier gases which contain water vapor, for example the reaction gases from the synthesis of anthraquinone, the treatment vessel must either be well insulated or even be heated, so that water does not condense on the vessel walls (column five, lines 37–50).

According to the teaching of the German specification the chilling of the sublimate to a low temperature cannot be regulated, when, for example, a fine spray of water, or cold water is used, and particle size and purity of the condensed product cannot then be controlled. Such a process is, as is described in column two of the specification, even less advisable when the sublimed material is accompanied by impurities as is known to be the case in the production of anthraquinone. The risk of separation of an impure product is emphasized.

The gravest disadvantage of this process is that the dry precipitation of anthraquinone crystals can cause dust-explosions and fire in the treatment zone (desublimator) and precipitation apparatus. Furthermore, in the case of a rather high content of by-products as a result of the correspondingly high dew point, a part of the anthraquinone vapor is lost in the waste gas, the condensed anthraquinone can moreover be highly contaminated.

The object of this invention is to provide a simpler and more economical method of separating anthraquinone in higher yield and in purer form.

It has now been found that anthraquinone can advantageously be separated from a mixture of its vapor with a hot carrier gas, when the mixture of anthraquinone vapor and carrier gas is heated to a temperature of at least 200°C, is treated with an aqueous suspension of anthraquinone at a temperature below the boiling point of water at the prevailing pressure.

In comparison with known methods, the process according to the invention surprisingly produces a simpler and more economical way of separating anthraquinone in higher yield and in purer form. If crude anthraquinone is used which contains significant quantities of phthalic anhydride, benzoic acid or maleic anhydride as by-products, a better purification is achieved of the anthraquinone which is moreover prepared in higher yield. No recrystallization or further purification is necessary of the anthraquinone obtained as for example by resublimation, although this is advisable in similar cases when using the known process. The aqueous suspension used in the treatment surprisingly dissolves the impurities without inclusion or absorption of these by-products to any significant extent by the suspended anthraquinone. Although the hot reaction gases are cooled quickly and intensively, the anthraquinone is precipitated in a readily filterable pure form. By filtering the anthraquinone and fractional crystallization, the by-products are easily removed from the filtrate, thus providing by means of the process according to the invention a simple and economical process for the reutilization of these substances which are useful for numerous syntheses. The water used for the suspension needs neither to be distilled nor to be softened. The operational reliability is increased by the avoidance of the dry precipitation of the anthraquinone. All these advantages are especially pronounced in the continuous large-scale production.

Advantageously there is used as the mixture to be treated the hot reaction gases of the anthraquinone production process, which may for example be the oxidation of anthracene or preferably the oxidation of indanes such as 1-methyl-3-phenylindane, for example in the presence of vanadium-V-catalysts or molybdenum oxide and tungsten oxide catalysts. As oxidation processes there may be mentioned for example the processes described in Ullmann's Encyklopaedie der technischen Chemie volume 3 page 661 and in Belgian Patent Specification No. 752,049. In all these processes, the reaction gases and hence the mixture to be treated in the process of the invention contain as a rule from 10 to 100 g, preferably 20 to 50 g anthraquinone, from 0 to 10 g phthalic anhydride, from 0 to 5 g benzoic acid, from 0 to 5 g maleic anhydride, from 0.1 to 0.2 standard cubic meters of oxygen, from 0.4 to 0.8 standard cubic meters of nitrogen for each normal cubic meter of reaction gas and by-product gases, e.g., water vapour, carbon monoxide and carbon dioxide. The mixture to be treated as a rule has a temperature of 200° to 500°C, preferably 250° to 400°C, and is at atmospheric or superatmospheric pressure, desirably an absolute pressure of 1 to 3 atmospheres. It may be treated with the suspension discontinuously or preferably continuously. The flow speed of the mixture to be treated through the treatment zone (desublimator) is preferably from 0.1 to 50 meters per second.

The hot reaction gas is cooled by the aqueous suspension, so that depending upon its temperature at the inlet of the treating zone the gas attains a temperature of from 50° to 80°C (adiabatic saturation temperature). The aqueous suspension desirably contains from 2 to 20 weight percent of anthraquinone, and advantageously has a temperature of from 20° to 95°C. At least part of the suspension which has been used to treat the gas-vapor mixture is preferably recycled to treat further quantities of the mixture. When recycling is used the suspension is as a rule used at a temperature of 50°–80°C to treat the gas-vapor mixture at the pressure prevailing in the treatment zone. As a rule an amount of the aqueous suspension containing from 0.2 to 10 kg and preferably from 1 to 4 kg of water is used for each standard cubic meter of the gas-vapor mixture treated.

In a preferred embodiment, the suspension is metered into the treatment zone so that the gas and the suspension are intimately mixed. Anthraquinone and the condensible or water-soluble by-products such as phthalic anhydride, benzoic acid and maleic anhydride are removed by the suspension from the hot reaction gases. With the formation of acids from the anhydrides, the by-products pass into solution, whilst the anthraquinone remains in suspension in the aqueous mixture in the form of readily filterable crystals. Preferably after the treatment the suspension is collected and continuously recycled. In a preferred embodiment there is used as treatment liquid a recycled suspension with the aforementioned preferred anthraquinone content which also contains from 1 to 5 weight percent of phthalic acid, from 0.5 to 5 weight percent of benzoic acid, and from 1 to 40 weight percent of maleic acid. The by-products can be previously added to the suspension being recycled, but they are desirably extracted from the reaction gases. The suspension is allowed to become enriched in anthraquinone and by-products by continuously withdrawing a portion of the suspension from circulation and adding water.

The quantity of water added depends upon the quantity of liquid removed and upon the quantity of water vapor introduced with the reaction gases and the quantity of water vapor escaping from the treatment zone.

Advantageously the above-mentioned embodiment is carried out with recycling of the suspension and separation of the by-products. For reasons of economy the quantity of waste-water is kept as small as possible. Thus only a part of the suspension issuing from the treatment zone (desublimator) is recycled, a portion of 1 to 50 weight percent calculated on the total suspension recycled is withdrawn for the separation therefrom of anthraquinone by filtration. Advantageously the anthraquinone is washed countercurrent, the wash-water desirably being added to the suspension being recycled. The filtrate removed is cooled to a temperature of from 10° to 35°C advantageously to 20° to 30°C. The bulk of the phthalic and benzoic acids precipitates and is separated e.g. by filtration. If desired, however, the benzoic acid can be recovered from the recycled suspension by extraction. A small part, desirably from 1 to 10 weight percent of the total, of the filtrate from the phthalic acid separation is removed, the remainder of the filtrate being recycled. Advantageously in this embodiment the amount of filtrate removed is controlled so that the suspension contains from 1 to 40 weight percent and preferably from 15 to 20 weight percent of dissolved maleic acid along with phthalic acid and benzoic acid.

With regard to the avoidance of excessive amounts of waste-water it is particularly advantageous to add to the circulating suspension alkaline compounds, e.g., sodium hydroxide, carbonate or bicarbonate and preferably ammonia or ammonium compounds. If the pH of the suspension is adjusted by this addition to a value between 3 and 8 and preferably between 4.0 and 5.0, the organic acids are partially converted into their salts which are significantly more soluble in water than the free acids. Thus by addition of ammonia, one can maintain in the suspension concentrations of up to 50 weight percent of the dissolved salts. Desirably the alkaline compound, especially ammonia, is added to the wash-water used for the washing. If the wash-water is used in several stages counter-current, this addition is preferably made in the first stage of the washing process. In this preferred embodiment an especially pure anthraquinone is obtained, since the precipitation which otherwise may occur of oily or tarry by-produts on to the anthraquinone is here avoided.

The anthraquinone which can be prepared by the process of the invention is a valuable intermediate for the preparation of dyes and pesticides. With regard to its use the reader is referred to the aforementioned publications and Ullmann's Encylkopaedie der technischen Chemie, volume 3, page 659, et seq.

Where not otherwise stated the parts in the following Examples are parts by weight: they stand in the same relationship to parts by volume as does the kilogram to the liter.

EXAMPLE 1

As is shown in the attached schematic drawing, anthraquinone synthesis reaction gas 8 containing, under standard conditions, for each cubic meter of air, 17.9 g anthraquinone, 7.2 g phthalic anhydride 3.3 g benzoic acid and 2.5 g maleic anhydride was passed at a temperature of 400°C into the desublimator 1, where it was treated at a temperature of 60°C with a suspension in the ratio of 3 parts suspension to one part of reaction gas. 250,000 parts by volume of reaction gas was passed per hour through the desublimator. The circulating suspension 9 containing 5.5 parts of suspended anthraquinone per 100 parts of water was led via three nozzles 2 into the hot gas stream. The anthraquinone desublimed in the form of fine needle-shaped crystals. The by-products were dissolved in the suspension with conversion of the anhydrides to the corresponding acids. 108 parts 10 of the suspension were removed per hour from the desublimator. The anthraquinone crystals suspended in the portion 10 removed were separated on a rotary filter 3, washed with water at 95°C, and dried in the adjacent drier 4. 4.5 parts per hour of anthraquinone of 98 percent by weight purity was obtained. The filtrate 11 issuing from the filter 3 was cooled and subjected to crystallization 5 at 30°C. The phthtalic acid and benzoic acid crystals so obtained were separated 12 on a separating apparatus 6. 4.4 parts per hour of solution 13 were led off for the separation of maleic acid, while the bulk 14 of the filtrate was recycled to the desublimator. By the removal of the filtrate 13 containing in solution 20 parts of maleic acid, 1.3 part of phthalic acid and 1.1 part of benzoic acid per 100 parts of water, the maleic acid content of the suspension was maintained at 20 parts of maleic acid per 100 parts of water. 60 parts of fresh water 15 per hour were added to the desublimator. The waste gas 16 was passed out through a Venturi washer 7.

EXAMPLE 2

The reaction gas was subjected at 65°C to a treatment similar to that used in Example 1. The suspension circulated contained 20 parts of anthraquinone and 32 parts of phthalic, maleic and benzoic acids partially neutralized with ammonia. The acids and salts were dissolved in the aqueous phase of the suspension. The pH was maintained at a value between 4.2 and 4.6 by the addition of 1.8 parts per hour of aqueous ammonia (25 weight percent solution). 30 parts per hour of suspension were removed from the desublimator, the anthraquinone was separated from the liquid with the aid of a rotary pressure filter, washed first with aqueous ammonia (first wash) and then with ammonia-free water at 95°C (second wash) and finally dried. For the first wash there was used 1.8 parts per hour of the aforementioned aqueous ammonia to which had been added 60 parts of water derived from the wash waters obtained from a previous second wash. 4.5 parts per hour of anthraquinone of 98 percent purity were obtained. From the filtrate from the anthraquinone separation 10 parts per hour were withdrawn for passage to the recovery of the acids; the remainder was added to the suspension being recycled.

We claim:

1. A process for separation of anthraquinone from a mixture of its vapor with a hot carrier gas, wherein the gas-vapor mixture at a temperature of at least 200°C is treated in a desublimation zone with an aqueous suspension of anthraquinone at a temperature below the boiling point of water at the prevailing pressure.

2. A process according to claim 1 wherein the said mixture comprises the hot reaction gases from the oxidation of indanes in the presence of vanadium-V-catalysts or molybdenum oxide and tungsten oxide catalysts.

3. A process according to claim 2 wherein the hot reaction gases are obtained from the oxidation of 1-methyl-3-phenyl-indane.

4. A process according to claim 1, wherein the gas-vapor mixture treated contains from 10 to 100 g anthraquinone per standard cubic meter of the mixture.

5. A process according to claim 4 wherein the gas-vapor mixture treated contains from 20 to 50 g anthraquinone per standard cubic meter of the mixture.

6. A process according to claim 1, wherein the gas-vapor mixture at a temperature of from 200° to 500°C is treated with the aqueous suspension.

7. A process according to claim 6, wherein the said temperature is from 250° to 450°C.

8. A process according to claim 1, wherein the gas-vapor mixture is treated with the aqueous suspension at an absolute pressure of from 1 to 3 atmospheres.

9. A process according to claim 1, wherein the gas-vapor-mixture is treated with an aqueous suspension of from 2 to 20 weight percent of anthraquinone at a temperature of from 20° to 95°C.

10. A process according to claim 1, wherein for each standard cubic member of the gas-vapor-mixture treated there is used an amount of the aqueous suspension which contains 1 to 4 kg of water.

11. A process according to claim 1, wherein the aqueous suspension contains from 5 to 20 weight percent of anthraquinone is used at a temperature of 50° to 80°C to treat the gas-vapor-mixture and the suspension is then recycled to said desublimation zone.

12. A process according to claim 11 wherein the suspension being recycled is treated with an alkaline compound.

13. A process according to claim 12, wherein the suspension being recycled is treated with an ammonia or an ammonium compound.

14. A process according to claim 12, wherein the quantity of alkaline compound added is selected to bring the suspension to a pH of from 3 to 8.

15. A process according to claim 13, wherein the quantity of alkaline compound added is selected to bring the suspension to a pH of from 4.0 to 5.0.

16. A continuous process as claimed in claim 1 for separation of anthraquinone from a mixture of its vapor with a hot carrier gas, wherein the mixture of anthraquinone and carrier gas at a temperature of at least 200°C is treated with an aqueous suspension of anthraquinone at a temperature below the boiling point of water at the prevailing pressure, and wherein a minor part of the aqueous suspension after the said treatment is separated, and anthraquinone is recovered from this part and the remainder of the suspension is recycled to said desublimation zone, and wherein the mother liquor from the said recovery of the anthraquinone is cooled to from 10° to 35°C and organic acids are recovered from it.

* * * * *